United States Patent [19]

Sakai et al.

[11] Patent Number: 5,204,759
[45] Date of Patent: Apr. 20, 1993

[54] IMAGE PROCESSING APPARATUS

[75] Inventors: Masanori Sakai; Hiroyuki Horii, both of Yokohama; Takayuki Komine, Kawasaki; Yasumichi Suzuki; Yoshinori Ikeda, both of Tokyo; Toshio Honma, Kawasaki, all of Japan

[73] Assignee: Canon Kabushiki Kaisha, Tokyo, Japan

[21] Appl. No.: 931,445

[22] Filed: Aug. 20, 1992

Related U.S. Application Data

[60] Continuation of Ser. No. 665,040, Mar. 21, 1991, abandoned, which is a division of Ser. No. 256,474, Oct. 12, 1988, Pat. No. 5,032,928.

[51] Int. Cl.⁵ .................................... H04N 1/40
[52] U.S. Cl. ........................................ 358/444; 358/404
[58] Field of Search ............. 358/444, 437, 434, 404

[56]  References Cited
U.S. PATENT DOCUMENTS 3,949,159  4/1976  Ricards et al. ............... 178/6.6 B
4,320,962  3/1982  Takahashi et al. .............. 355/14 C
4,417,805  11/1983  Kishi .............................. 355/14 R
4,639,791  1/1987  Masaki ............................ 358/300
4,794,423  12/1988  Shimizu et al. ................. 355/14 R
4,920,427  4/1990  Hirata ............................. 358/437

FOREIGN PATENT DOCUMENTS 029327  5/1981  European Pat. Off. .
087912  9/1983  European Pat. Off. .
55-96761  7/1980  Japan ............................. 358/437
57-17362  10/1982  Japan ............................. 358/450
58-90658  5/1983  Japan .
59-186465  10/1984  Japan ............................. 358/437
2082014  2/1982  United Kingdom .
2133657  7/1984  United Kingdom .

Primary Examiner—Edward L. Coles, Sr.
Assistant Examiner—Thomas L. Stoll
Attorney, Agent, or Firm—Fitzpatrick, Cella, Harper & Scinto

[57]  ABSTRACT

An image processing apparatus reads an image and synthesizes it with another, standardized image signal supplied from outside the apparatus and stored in a memory provided in the apparatus.

9 Claims, 14 Drawing Sheets

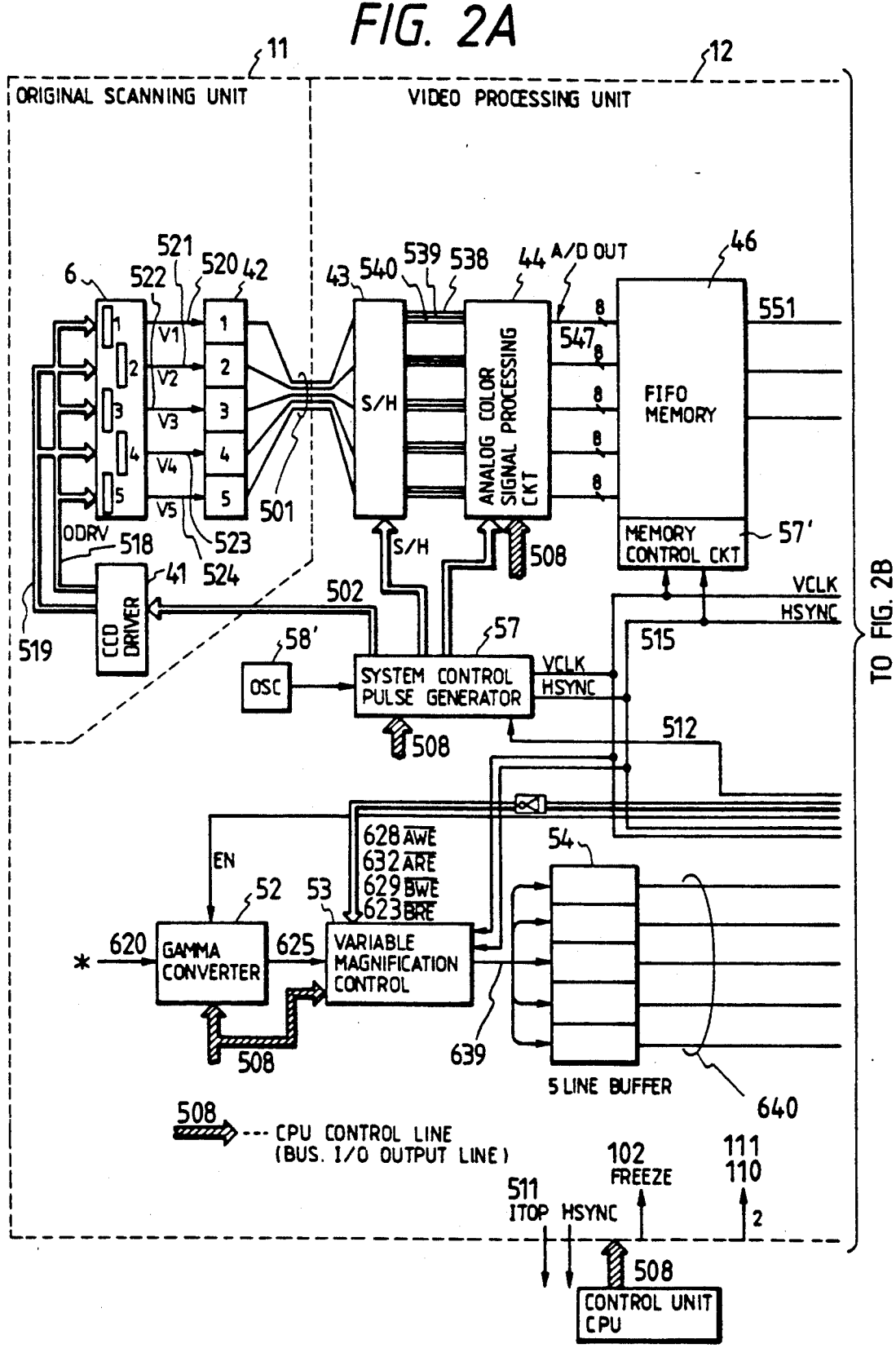

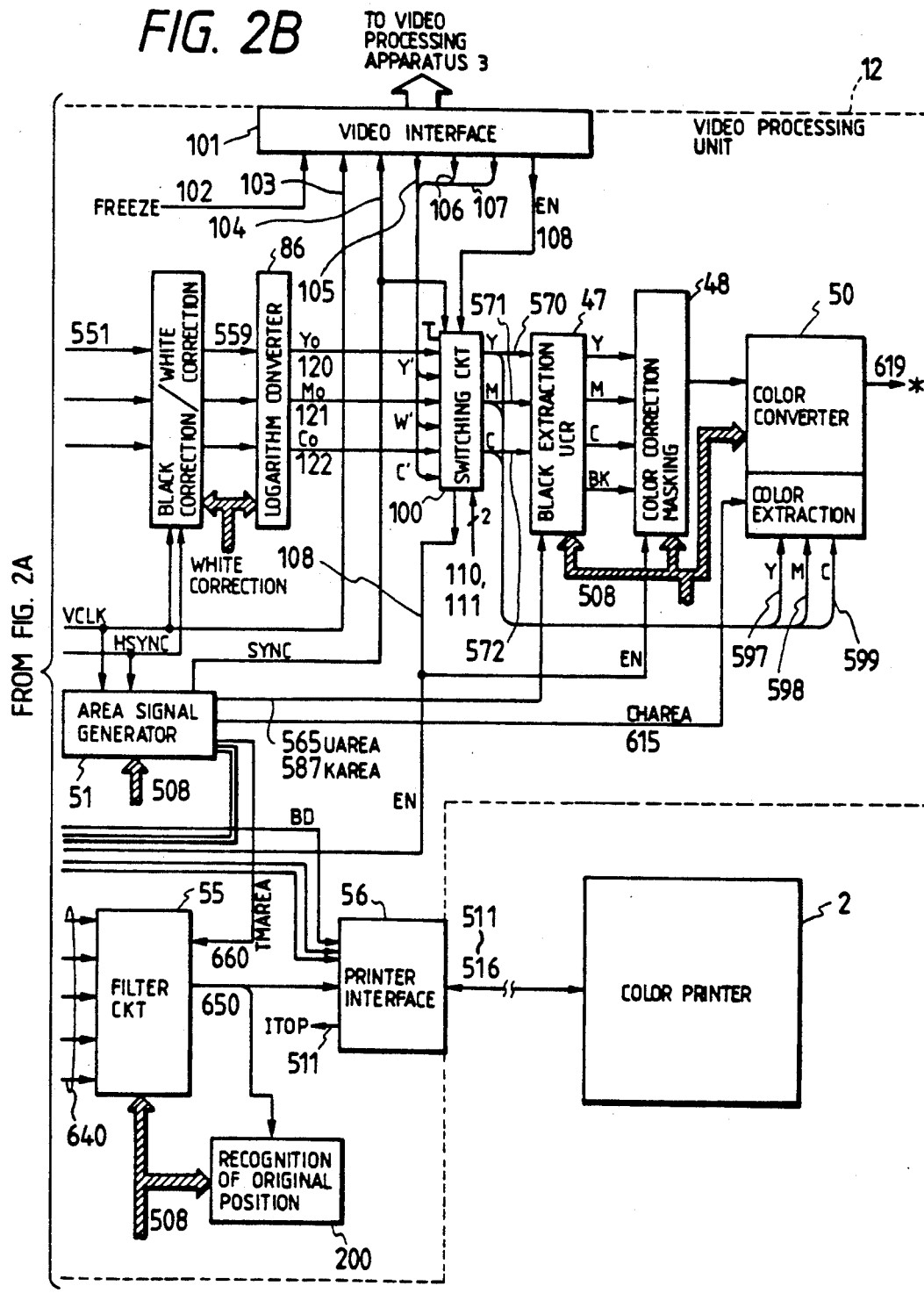

CAS BEFORE RAS REFRESH

IMAGE PROCESSING APPARATUS

This application is a continuation of application Ser. No. 07/665,040, filed Mar. 21, 1991, now abandoned, which was a division of application Ser. No. 07/256,474, filed Oct. 12, 1988, now U.S. Pat. No. 5,032,928.

BACKGROUND OF THE INVENTION

1. Field of the Invention

The present invention relates to an image processing apparatus, and more particularly to an image processing apparatus capable of synthesizing plural images.

2. Related Background Art

There are already known image synthesizing apparatus for preparing an image by synthesizing plural images.

Among such apparatus, there is for example known one, disclosed in U.S. Pat. No. 4,320,962 of the present assignee, for storing two original images in two memories and synthesizing said two images by displacing the timing of image signal reading from said two memories. There have also been various proposals on image synthesis, such as those disclosed in the U.S. Pat. No. 4,417,805 and U.S. patent application Ser. No. 06/932,030.

However, such apparatus are only capable of reading and synthesizing original images, and are unable to effect synthesis with images other than such original image.

There is also known a digital copying machine capable of trimming a predetermined portion of an original image, for example, with a digitizer, and copying the image only of thus-trimmed image.

However, in synthesizing a video signal supplied from the outside in such copying machine, there is required a complex structure for designating the synthesizing position of said video signal, separately from the trimming function of said copying machine.

Also, there is already known a recording apparatus having a page memory capable of storing input image data of at least a frame, and capable of producing plural prints of the same image based on image data read from said page memory.

In such apparatus there may occur jamming of printing sheets or exhaustion of the supply of printing sheets in the course of printing plural sheets.

In order to rectify such situation, the present applicant has already proposed a technique involving not repeating the data writing into the page memory but automatically continuing the printing of plural sheets after such error state is resolved.

However, such apparatus is often inconvenient for use, since the printing of plural sheets is automatically continued when the error state is resolved.

More specifically, when the operator resolves the error state, the printing operation is executed immediately without any other actuation. Such situation is different from the ordinary printing operation and may be misunderstood as an error operation by the operator.

Furthermore, if the aforementioned page memory is composed of a memory device requiring refreshing at a predetermined interval, such as a DRAM, synchronization signals for said refreshing operation are obtained for example from a clock generator to retain the internally stored information.

However, if the reference signals generated for refreshing operation of the DRAM are switched to other non-synchronized signals for some reason, the refreshing interval may be prolonged before or after said switching, whereby the stored information may become unstable and eventually last.

SUMMARY OF THE INVENTION

A first object of the present invention is to provide an improvement on the aforementioned image processing apparatus.

Another object of the present invention is to provide an image processing apparatus capable of synthesizing externally supplied image signals with image signals obtained by scanning an original image.

Under such object, it is still another object of the present invention to provide image processing enabling such image synthesis in a satisfactory manner.

The foregoing objects can be achieved, according to an embodiment of the present invention, by an image processing apparatus comprising:

means for designating an area for image fitting;

means for supplying an image of a predetermined size to be fitted into said area; and means for supplying another image, different from the first-mentioned image, into a portion between the area designated by said designating means and the area of the image supplied by said supplying means;

Still another object of the present invention is to provide an image processing apparatus capable of easy synthesis of images of mutually different kinds.

Still another object of the present invention is to provide an image processing apparatus capable of satisfactorily preventing the undesirable influence of error, in the event such error occurs.

Still another object of the present invention is to provide an apparatus capable of securely protecting stored information.

Still other objects and features of the present invention, and the advantages thereof, will become fully apparent from the following description to be taken in conjunction with the attached drawings.

BRIEF DESCRIPTION OF THE DRAWINGS

FIG. 2, consisting of FIGS. 2A and 2B, is a block diagram of an original scanning unit 11 and a video processing unit 12 shown in FIG. 1;

DETAILED DESCRIPTION OF THE PREFERRED EMBODIMENTS

Now the present invention will be clarified in detail by description of the preferred embodiments thereof shown in the attached drawings.

Figure 1:
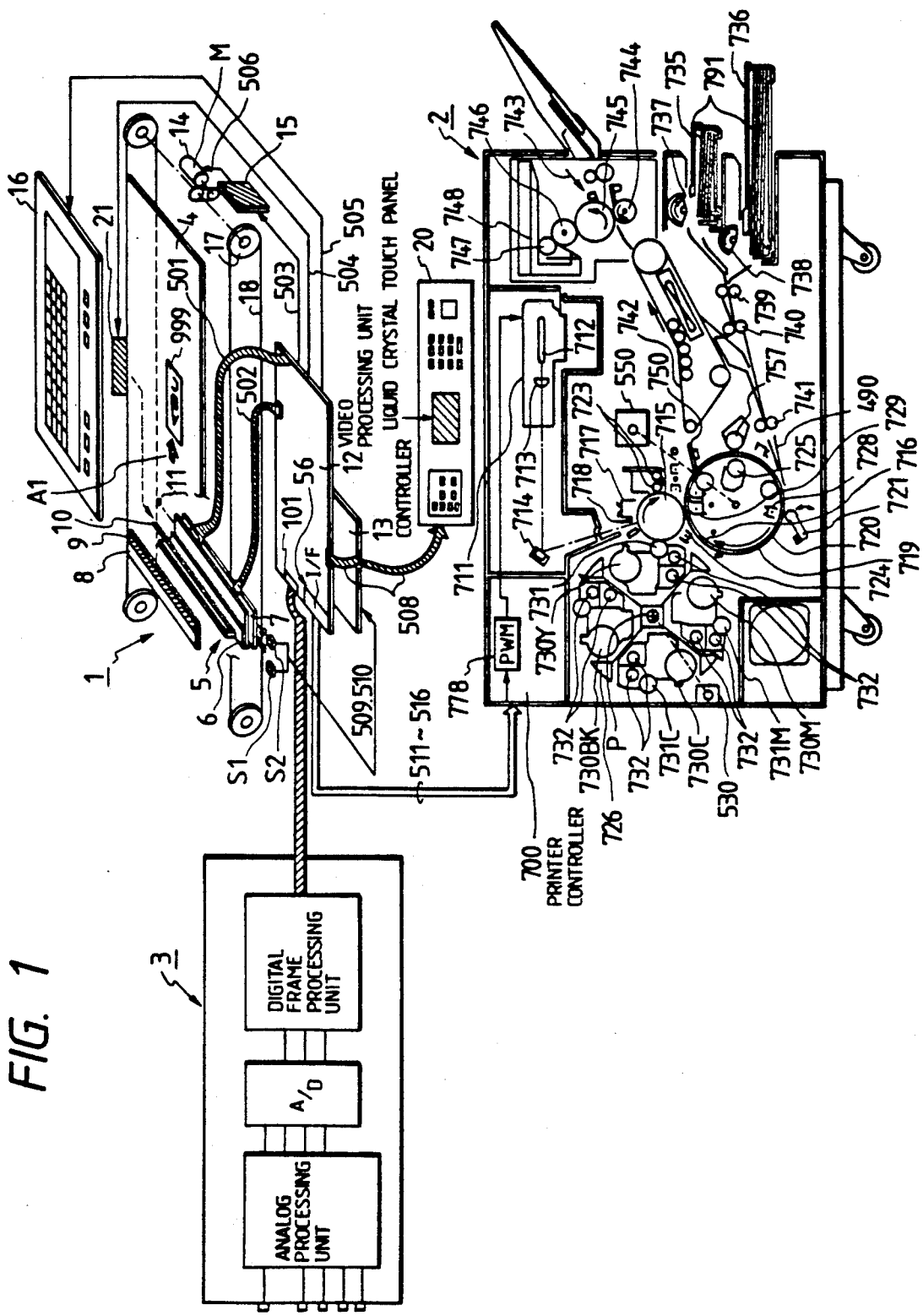
FIG. 1 is a schematic view showing the internal structure of a color image forming system embodying the present invention.

FIG. 1 shows an example of the internal structure of a color image forming system embodying the present invention. This system consists of an upper digital color image reading unit 1 (hereinafter called color reader), a lower digital color image printing apparatus 2 (hereinafter called color printer), and a video processing apparatus 3. Said color reader 1 is capable of reading color image information of an original image in respective color components and converting the same into electrical digital image signals by means of color separating means to be explained later and a photoelectric converting device such as CCD. The color printer 2 is composed of an electrophotographic laser beam printer for reproducing color images of respective colors according to said digital image signals and transferring said images plural times in digital dot form onto a recording sheet. The video processing apparatus 3 serves to convert analog video signals, supplied from an external video apparatus, into digital image signals for supply to said color reader 1.

At first there will be explained the structure of the color reader 1, in which there are shown an original document 999; a platen glass 4 for supporting the original document; and a rod-array lens 5 for focusing the reflected light, from the original illuminated by a halogen exposure lamp 10 onto a same-size full-color sensor 6, and the above-mentioned components 5, 6, 7 and 10 constitute an original scanning integral unit 11 for executing a scanning motion in a direction A1. Color-separated image signals obtained line by line in the course of the scanning motion are amplified to a predetermined voltage level by a sensor output signal amplifying circuit 7, and are supplied by a signal line 501 to a video processing unit for signal processing. Said line 501 is composed of a coaxial cable for ensuring faithful signal transmission. A signal line 502 serves for supplying driving pulses for the same-size full-color sensor 6, and all necessary pulses are generated in a video processing unit 12. A white board 8 and a black board 9 for white and black level correction of the image signals respectively provide signal levels corresponding to predetermined densities when illuminated by the halogen exposure lamp 10.

A control unit 13, incorporating a microcomputer, controls: the display on an operation panel 20; control of key input; control of the video processing unit 12; detection of the position of the original scanning unit 11 by means of position sensors S1, S2, through signal lines 509, 510; a stepping motor driving circuit 15 for driving a stepping motor 14 for moving the scanning unit 11, through a signal line 503; on/off control and light intensity control of the halogen exposure lamp 10 by means of an exposure lamp driver 21, through a signal line 504; a digitizer 16, through a signal line 505; internal keys; an operation unit; and any other parts of the color reader 1, all through a bus 508. The color image signals read by the exposure scanning unit 11 in the course of scanning motion are supplied, through the amplifying circuit 7 and the signal line 501, to the video processing unit 12.

In the following there will be explained the color printer 2, wherein a scanner 711 is provided with a laser unit for converting the image signals from the color reader 1 into optical signals; a polygon mirror 712 for example of octagonal shape; a motor (not shown) for rotating said mirror 712; and an f/θ lens (imaging lens). There are also provided a mirror 714 for deflecting the optical path of the laser beam, and a photosensitive drum 715. The laser beam from the laser unit is reflected by the polygon mirror 712 and linearly scans (raster scanning) the photosensitive drum 715 through the lens 713 and the mirror 714, thereby forming a latent image corresponding to the original image.

There are further provided a primary charger 717, a whole-surface exposure lamp 718, a cleaner station 723 for recovering the toner which has not been transferred and thus remains on the drum; and a pre-transfer charger 724, which are positioned around the periphery of the photosensitive drum 715.

A developing unit 726 for developing the electrostatic latent image formed on the photosensitive drum 715 is provided with developing sleeves 731Y, 731M, 731C and 731Bk for effecting development in contact with the photosensitive drum 715, toner hoppers 730Y, 730M, 730C and 730Bk for toner supply, and screws 732 for toner transfer, which in combination constitute the developing unit 726 and are positioned around a rotary shaft P thereof. For example, in the case of forming a yellow toner image, the development is conducted in the illustrated position with the yellow toner, and, in case of forming a magenta toner image, the developing unit 726 is so rotated about the shaft P that the developing sleeve 731M in the magenta developing unit is brought to a position in contact with the photosensitive drum 715. The development with cyan or black color is also conducted in a similar manner.

There are further provided a transfer drum 716 for transferring a toner image formed on the photosensitive drum 715 onto the recording sheet; an actuator plate 719 for detecting the position of the transfer drum 716; a position sensor 720 for detecting a home position of said transfer drum 716 when said actuator plate 720 is brought close; a transfer drum cleaner 725; a paper pressing roller 727; a charge eliminator 728; and a transfer charger 729; which are positioned around the transfer roller 716.

There are further provided paper cassettes 735, 736 containing recording paper (sheets); paper feeding rollers 735, 736; and timing rollers 739, 740, 741 for regulating the timing of sheet feeding and transportation. The sheet transported by these rollers is guided by a paper guide 749, and, while the front end thereof being held by a gripper to be explained later, it is wound around the transfer drum 716 and enters an image forming process.

There are further shown a drum motor 550 for rotating the photosensitive drum 715 and the transfer drum 716 in synchronization; a separating claw 750 for separating the sheet from the transfer drum 716 after the completion of the image forming process; a conveyor belt 742 for transporting a thus-separated sheet; and an image fixing station 743 having a pair of heat-pressure rollers 744, 745 for fixing the image of the sheet transported by the conveyor belt 742.

Now reference is made to FIG. 2 for explaining the details of the original scanning unit 11 and the video processing unit 12.

The color image signals supplied to the video processing unit 12 are separated, in a sample and hold circuit S/H 43, into signals of green (G), blue (B) and red (R). The separated color image signals are subjected, in an analog color signal processing circuit 44, to an analog process and an A/D conversion to obtain digital color image signals. In the present embodiment, the color image sensor 6 in the original scanning unit 11 is composed of a staggered arrangement of five areas, as shown in FIGS. 2A and 2B, so that a FIFO memory 46 is employed for compensating for the aberration in the reading position between the preceding channels 2, 4 and other channels 1, 3, 5. The compensated signals from said FIFO memory 46 are supplied to a black correction/white correction circuit for compensation for unevenness in the dark characteristics of the color image sensor 6, unevenness in the intensity of the halogen exposure lamp 10 and unevenness in the sensitivity of said sensor 6, utilizing the signals corresponding to the reflected light from the aforementioned white board 8 and black board 9. The color image data proportional to the input light intensity to the color image sensor 6 are subjected to a conversion, in a logarithmic conversion circuit 86, for matching with the relative sensitivity characteristics of human eyes, and are supplied to a switching circuit 100 for selecting either the color image signals from the video interface 101 or those from the original scanning unit 11.

It is to be noted that the apparatus of the present embodiment constitutes an improvement on an embodiment disclosed in U.S. Pat. No. 4,873,510 of the present assignee.

Figure 14A:
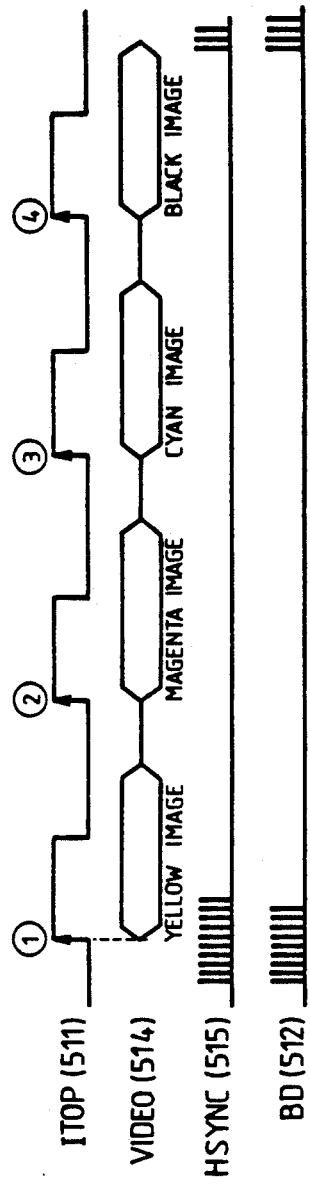
FIG. 14A, 14B and 14C are flow charts of the control sequence of a printer interface 56.
Figure 14B:
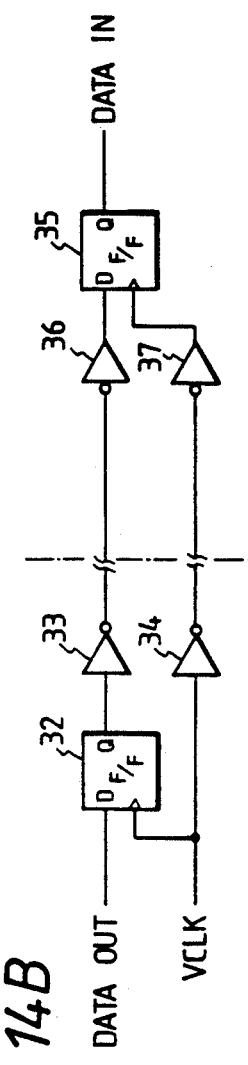
Figure 14C:
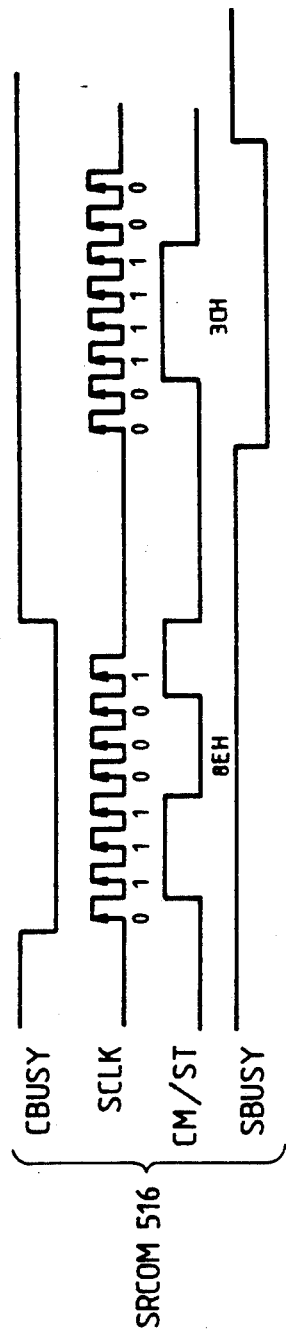

Signals ITOP, BD, BCLK, VIDEO, HSYNC and SRCOM (511-516) shown in FIG. 2 are interface signals between the color printer 2 and the reader 1 shown in FIG. 1. Based on these signals, the image signals VIDEO 514 read in the reader 1 are supplied to the color printer 2. As shown in FIG. 14A, the synchronization signal ITOP in the advancing direction of image (the sub-scanning direction) is generated four times in an image frame, respectively corresponding to the transfers of images of four colors (yellow, magenta, cyan and black) in synchronization with the rotation of the transfer drum 716 and the photosensitive drum 715 in such a manner that the leading end of a recording sheet wound on the transfer drum 716 in the color printer 2 is in registration with the leading end of the toner image at the transfer thereof in contact with the photosensitive drum 715. Said signal is supplied to the video processing unit in the reader 1, and further, as an interruption signal (signal 511) to a CPU 22 in the controller 13. Said CPU 22 executes image control in the sub-scanning direction, such as image editing, based on said interruption signal. A synchronization signal BD 512 in the direction of raster scanning (the main scanning direction) is generated once every rotation of the polygon mirror 712, or once every raster scanning. The image signals read in the reader 1 are supplied to the printer 2, by a main scanning line at a time, in synchronization with said signal BD. A synchronization clock signal VCLK 513 serves to send 8-bit digital video signals 514 to the color printer 2, by means of flip-flops 32 and 35 as shown in FIG. 14B. A main scanning synchronization signal HSYNC 515 is generated from the BD signal in synchronization with the VCLK signal 513 and has a same repeating frequency as that of the signal BD. Strictly speaking, the VIDEO signals 514 are transmitted in synchronization with said HSYNC signal 515. The BD signal 515, which is generated in synchronization with the rotation of the polygon mirror 712, contains the jitter of the motor for rotating said polygon mirror 712, and will result in jittering of the image if it is synchronized with said BD signal, so that the HSYNC signal 515 has to be generated from the jitter-free VCLK signal, based on the BD signal. SRCOM is a signal line for semi-duplex bidirectional serial communication. As shown in FIG. 14C, in synchronization with 8-bit serial clock signals SCLK during a command busy signal CRUSY from the reader, a command CM is released, in response to which a status signal ST is returned from the printer in synchronization with said clock signals. Said status signal ST includes, for example a status signal indicating that an image forming operation is in progress, and an error status signal indicating a sheet jamming or the like in the printer. This timing chart shows a case in which a command "8EH" is responded to by a status signal "3CH". The information exchange, including the commands from the reader to the printer, such as the selection of color modes or cassettes, and the status information from the printer such as sheet jamming, absence of sheets or waiting state, is conducted through said communication signal line SRCOM.

FIG. 14A is a timing chart showing the transmission of an image of four colors, according to the signals ITOP and HSYNC. The signal ITOP 511 is generated every rotation or every two rotations of the transfer drum 715, whereby the image data of yellow, magenta, cyan and black are supplied respectively at (1), (2), (3) and (4) from the reader 1 to the printer 2 to form a full color image of said four colors on the recording sheet. The HSYNC signal is released, for example in case of an image of A3 size with a longitudinal size of 420 mm with an image density of 16 pel/mm in the image advancing direction, 420×16=6720 times. Said signal is simultaneously supplied to a clock input port of a timer circuit 28 of the controller 13, whereby an interruption signal HINT 517 is supplied to the CPU 22 after the count of a predetermined number. In response the CPU 22 executes an image control in the image advancing direction, such as image extraction or image displacement.

In the following there will be explained the fetching of the color image data in the video processing unit 12 of the color reader 1, supplied from the video processing apparatus 3.

Figure 3:
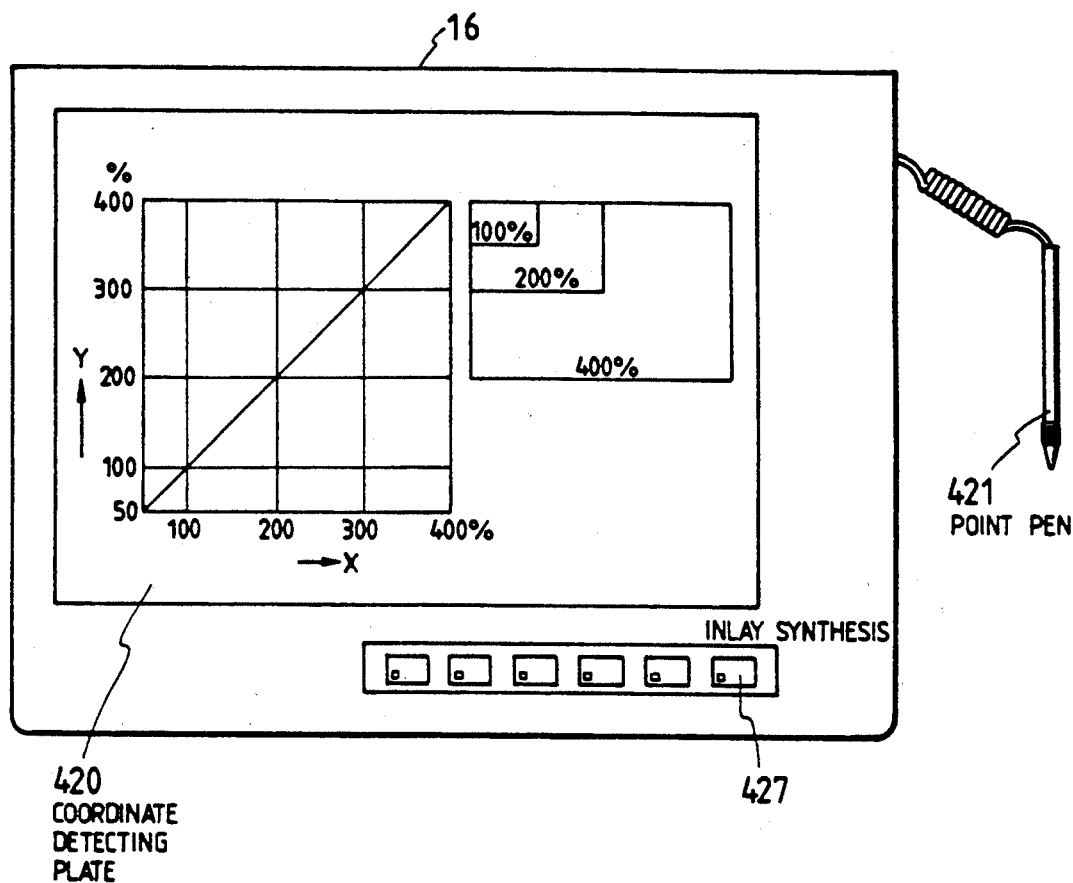
FIG. 3 is an external view of a digitizer 16 shown in FIG. 1.

Said fetching is set by a digitizer to be explained in the following. FIG. 3 is an external view of said digitizer 16, wherein are shown are: entry keys 427 for selecting inlay synthesis modes to be explained later; a coordinate detecting plate 420 for detecting the coordinate position for the purpose of designating an arbitrary area on the original, or an image magnification; and a pointer pen 421 for designating coordinate positions.

On said coordinate detecting plate 420, there are marked, in the upper right portion thereof, three different sizes, namely image ratios of 100%, 200% and 300%, in the image recording on a recording sheet from the video processing apparatus.

Figure 4:
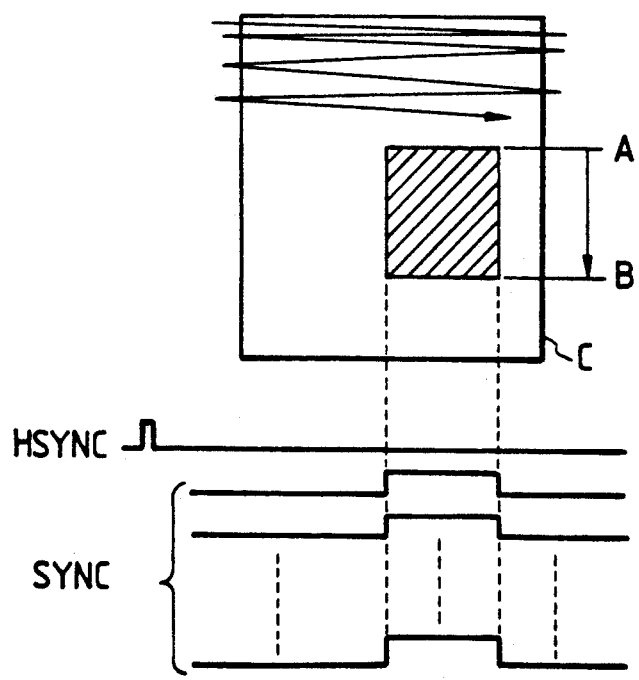
FIG. 4 is a view showing a fitting area.

The image inlay synthesis from the video processing apparatus 3 is conducted by depressing an inlay synthesis key 427 shown in FIG. 3, and designating an inlay position with the pointer pen 421. Said inlay area is for example a hatched area in FIG. 4, and is identified, in response to the designation by the digitizer 16, by a SYNC signal released from the area signal generating circuit 51 in a section A - B in the sub-scanning direction, namely such as a SYNC signal shown in FIG. 4. In FIG. 4, C indicates the entire size of the original, and a hatched area is the area designated by the digitizer. The SYNC signal 104 is sent to the video processing apparatus 3 through the video interface 101 shown in FIG. 2.

Figure 5:
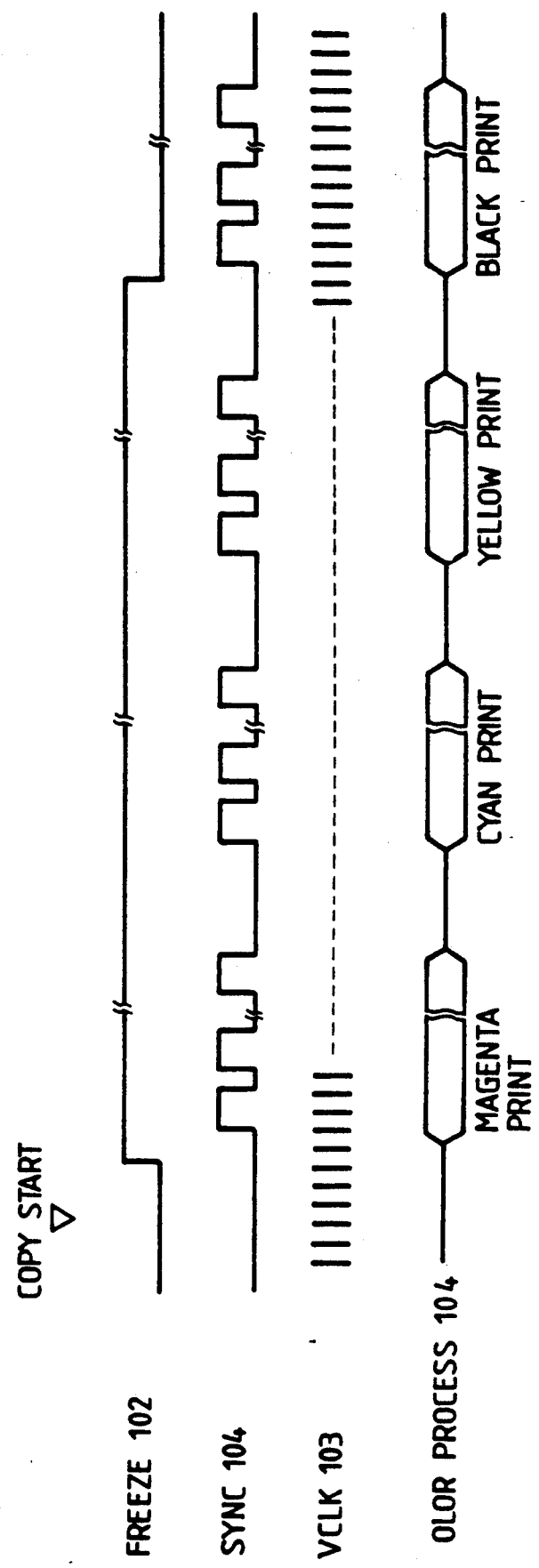
FIG. 5 is a timing chart showing signals FREEZE 102, VCLK 103 and SYNC 104 supplied from a video interface 101 to the video processing apparatus 3.

In addition to said SYNC signal, the video interface 101 provided with the video processing apparatus 3 with the FREEZE signal 102 and the VCLK signal 103, of which timing is shown in FIG. 5. The FREEZE signal 102 and the SYNC signal 104 are generated by the actuation of a start button in an operation unit 20. As shown in FIG. 5, the FREEZE signal 102 is shifted to level "1" in response to said start button, while the SYNC signal 104 is shifted to level "1" in a range corresponding to the area designated by the digitizer 16.

However, in case the number of copies exceeds one, and if the copy button is actuated after resolving of an error such as sheet jamming in the course of copying operation, the FREEZE signal 102 is not shifted to the level "1", but the signals SYNC 104 and VCLK 103 alone are supplied to the interface 101. In the present embodiment a full-color print is obtained by repating a color process 104 shown in FIG. 5, as indicated by the names of colors shown therein.

In the following there will be explained the function of the present embodiment, with reference to a flow chart of the controller (CPU) shown in FIG. 11.

When the power supply is started, the controller 13 reads the keys actuated on the operation panel 20 and on the digitizer 16 (#01). If there is actuated any key, there is discriminated whether said key is a key instructing the start of copying operation (#03), and the sequence, proceeds either to #05 or #23, respectively, depending on whether said key has been actuated or not.

In the following there will be explained the step #23 and the succeeding sequence when any key other than the copy start key is actuated.

A step #23 discriminates whether an area for inlay synthesis has been designated by a switch 427 shown in FIG. 3, and, if designated, the area designated by the digitizer 16 is memorized (#25). On the other hand, if not designated, there is discriminated whether the number of prints has been designated (#27). If the number of prints has been designated, said number is stored in a register (#29). If it is not designated, there is conducted a process for the other key (#31).

In the following there will be explained a case in which the start of a copying operation is designated in #03. When the start of copying operation is instructed, there is at first discriminated whether an error flag has been set (#05), and, if the error flag has not been set, and, in the absence of the error flag, there is generated the FREEZE signal 102 shown in FIG. 2 (#07), whereby image data are written in a memory 303 in the video processing apparatus to be explained later in relation to FIG. 7. Then the error flag is reset (#09). Then an instruction is given to the stepping motor driving circuit 15 shown in FIG. 1, whereby the scanner starts movement, and the signal processing circuits shown in FIG. 1 are activated in synchronization with the generated HSYNC and VCLK signals. Thus the color component signals are supplied to a color conversion circuit 50 shown in FIG. 2 and then supplied to the color printer 2. In response to the image signals supplied in succession from the video processing unit 12, a drum 716 to be explained later is rotated in response to the image data supplied in succession from the video processing unit 12, and the image top signal ITOP is returned to the unit 12 at each rotation. In the present embodiment, a full-color print is obtained with four colors of Y, M, C and Bk and requires, therefore, four rotations of the drum 716.

Thus a step #13 discriminates whether the ITOP signal has been supplied four times, and, if not, there is discriminated whether an error has been generated in the printer (#14). In the absence of error, the sequence returns to #13. In the presence of an error, an error flag is set, then the drive of the scanner is stopped, and there is discriminated whether the error state has been resolved (#21). On the other hand, if the step #13 detects that the ITOP signal has been supplied four times, indicating the completion of a print, there is executed a decrement of the print number register (#17). Then there is discriminated whether the content thereof has reached "0", and, if "0", the sequence returns to (A). On the other hand, if not "0", the sequence returns to #11 to continue the copying operation.

In the above-explained flow chart of the embodiment, if an error occurs in the color printer for example by sheet jamming (#14) in the course of a printing operation of plural prints, the copying operation is not restarted unless the copy start key is actuated, since the sequence returns to (A) after the error status is resolved.

Also, since the error flag is set in the step #19, the sequence proceeds from #5 to #11 when the copy start key is actuated in the aforementioned state (A), so that the FREEZE signal is not generated in the #07. Thus, it is possible to prevent the storage of new image signals in the memory 303.

In this manner the image data stored in the memory 303 prior to said error are still retained, and the erroneous storage of other data in said memory can therefore be avoided.

The image data synchronization signal VCLK 103 in the video processing unit 12 is supplied to the video processing apparatus 3, which supplies the video interface 101 with color image signals 105, 106, 107 synchronized with said VCLK signal 103 and an enable signal EN 108 indicating the effective range of said image signals. When said EN signal 108 is "0" or "1", the switching circuit 100 respectively selects the color image signals from the logarithmic conversion circuit 86, or those from the video interface 101 for supply to the succeeding circuit.

Though it is also possible to utilize the aforementioned SYNC signal 104 as the control signal for said switching circuit 100, the present embodiment employs the EN signal from the video processing apparatus 3 for this purpose, thereby achieving the following advantages.

If the above-mentioned SYNC signal is employed for controlling the switching circuit 100, and if the response of the video processing apparatus 3 is slow, the switching circuit 100 is shifted over before the output of the color image signals 105, 106, 107, whereby a black streak is formed at the switching operation of the switching circuit 100, namely at an ends of the inlay synthesis area of the image. On the other hand, the present embodiment is capable of preventing the formation of such black streak since the switching circuit 100 is controlled by the EN signal from the video interface 101.

The response of the video processing apparatus 3 becomes particularly slow, if image processing involving plural pixels, such as edge enhancement, is conducted therein.

Figure 10:
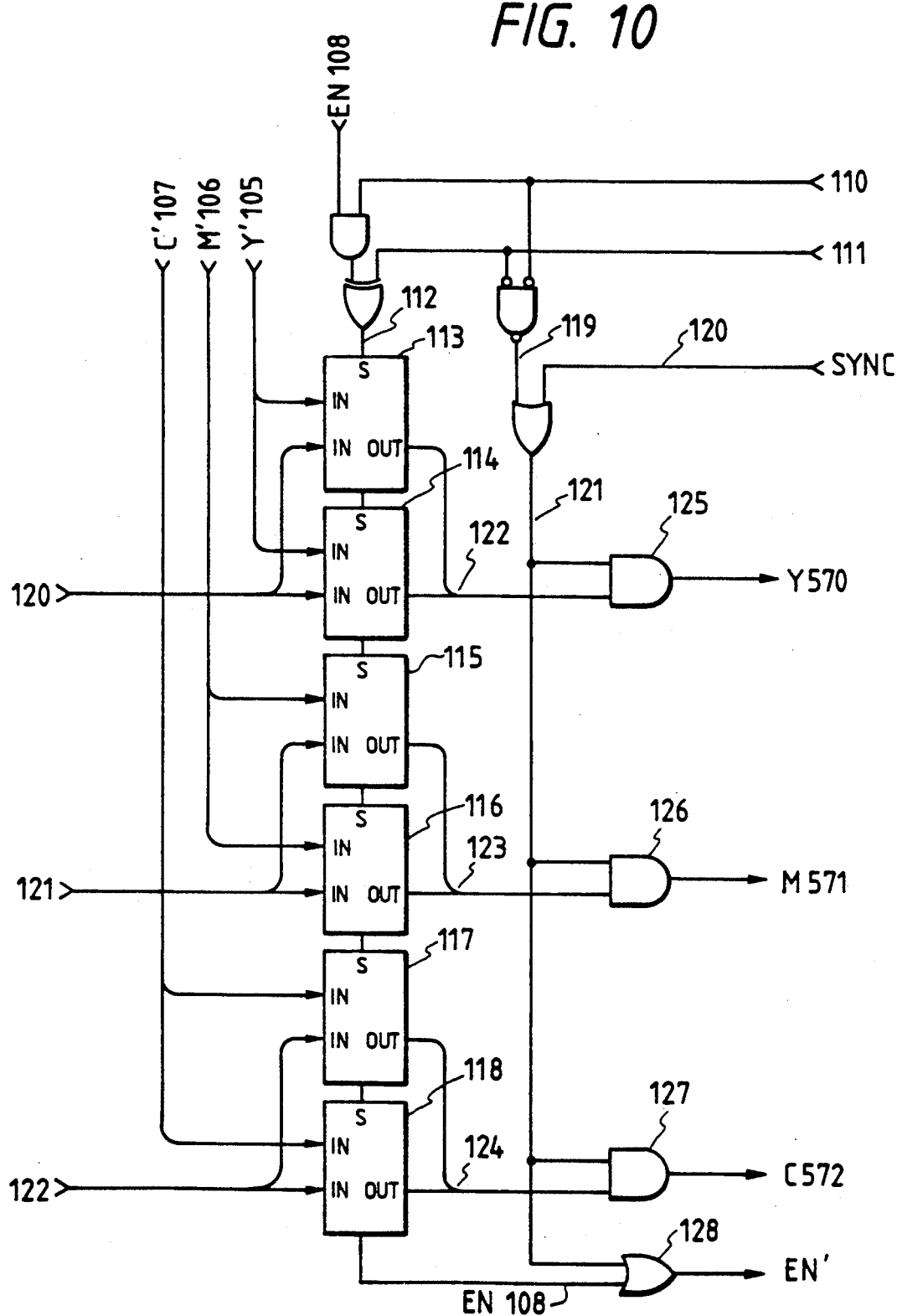
FIG. 10 is a block diagram showing the structure of a switching circuit shown in FIG. 2.

FIG. 10 is a detailed circuit diagram of the switching circuit 100, wherein data selectors 113–118 are composed of IC's such as 74LS157. Each data selector selects one of two input data, according to the signal 112 supplied to a selecting terminal S. When the signal 112 is at the level "0", the selector output lines Y570, M571 and C572 respectively select the signals $Y_0$ 120, $M_0$ 121 and $C_0$ 122, but, when said signal 112 is at the level "1", there are respectively selected the signals Y' 105, M' 106 and C' 107. Said selecting signal 112 is controlled, in addition to the EN signal 108, by signals 110, 111 from the controller 13. Also, there are shown gates 125–128, and a signal EN' corresponding to the logic sum of the EN signal 108 and the signal 121.

The switching circuit 100 selects the video image signal, the image signal of a reflective original (copying) or the inlay synthesis, according to the states of the signals 110, 111, as will be summarized in the following table:

| Signal 110 | Signal 111 | Function |
| --- | --- | --- |
| 0 | 0 | Reflective original |
| 0 | 1 | Video image |
| 1 | 0 | Inlay synthesis |
| 1 | 1 | Not possible |

Thus, when the signal 110, 111 are at the level "0", the image of the reflective original is trimmed in an area designated by the digitizer 16. In the following there will be explained the trimming of the reflective original, with reference to FIG. 10. Such trimming of the reflective original is conducted when the signals 110, 111 shown in FIG. 10 are both "0". In such case the exclusive-or signal 112 becomes "0", whereby the signals Y120, M121 and C122 from the logarithmic conversion circuit 86 are selected by the selectors 113, 114, 115, 116, 117 and 118 and are released as the signals 122, 123 and 124. Also, when said signals 110, 111 are both "0", a signal 119 also becomes "0", whereby the SYNC signal 120 from the area signal generating circuit 51 is supplied directly to AND gates 125, 126, 127.

In this manner the image signals 122, 123, 124 supplied to the AND gates 125, 126, 127 are controlled by the SYNC signal 120. As the area signal generating circuit 51 generates the SYNC signal corresponding to the area designated by the digitizer 16, the trimming is conducted on the reflective original, corresponding to the area designated by the digitizer 16, in such case.

Also in response to the EN signal there are controlled color correction, masking, gamma conversion, etc., according to the nature of the image. Said EN signal 108 is supplied also to a color correction/masking circuit 48 and a gamma conversion circuit 52 to be explained later.

Now reference is again made to FIG. 2. The signals from the switching circuit 100 are supplied to a black extraction (undercolor removal UCR) circuit 47 to generate a black component signal, which is subtracted from the color signals 570, 571, 572. The color correction/masking circuit 48 executes color correction of the color image signals, in consideration of the color separating filters in the color image sensor 6 (FIG. 1) and the video processing apparatus 3.

In the following there will be explained the function of the color correction/masking circuit 48.

There is already well known a masking correction, for the color component data $Y_i$, $M_i$, $C_i$, according to the following first-order calculation:

$$\begin{pmatrix} Y_0 \\ M_0 \\ C_0 \end{pmatrix} = \begin{pmatrix} a_{Y1} & -b_{M1} & -c_{C1} \\ -a_{Y2} & b_{M2} & c_{C2} \\ -a_{Y3} & -b_{M3} & c_{C3} \end{pmatrix} \begin{pmatrix} Y_i \\ M_i \\ C_i \end{pmatrix}$$

In the color correction/masking circuit 48 of the present embodiment, the coefficients are rendered variable for the input image, by setting into the CPU through the data bus 508.

More specifically, in the present embodiment, the first matrix coefficients $M_1$ or the second matrix coefficients $M_2$ can be set through a bus connected to the controller 13:

$$M_1 = \begin{pmatrix} a_{Y1} & -b_{M1} & -c_{C1} \\ -a_{Y2} & b_{M2} & -c_{C2} \\ -a_{Y3} & -b_{M3} & c_{C3} \end{pmatrix}$$

$$M_2 = \begin{pmatrix} a_{Y1} & -\beta_{M1} & -\gamma_{C1} \\ -a_{Y2} & \beta_{M2} & -\gamma_{C2} \\ -a_{Y3} & -\beta_{M3} & \gamma_{C3} \end{pmatrix}$$

The coefficients $M_1$ serve for the correction of the color separating filters in the original scanning unit 11, and the coefficients $M_2$ serves for the correction of the video processing apparatus 3.

These two sets of the coefficients $M_1$, $M_2$ are selected by the EN signal 108 supplied from the video interface 101. Thus the color correction is conducted by selecting either the coefficients $M_1$ in case of the color image signals from the original scanning unit 11, or the coefficients $M_2$ in case of the signals from the video processing apparatus 3. The output of the color correction/masking circuit 48 is supplied to a color conversion circuit 50, which in fact executes no conversion in the present embodiment.

Figure 6:
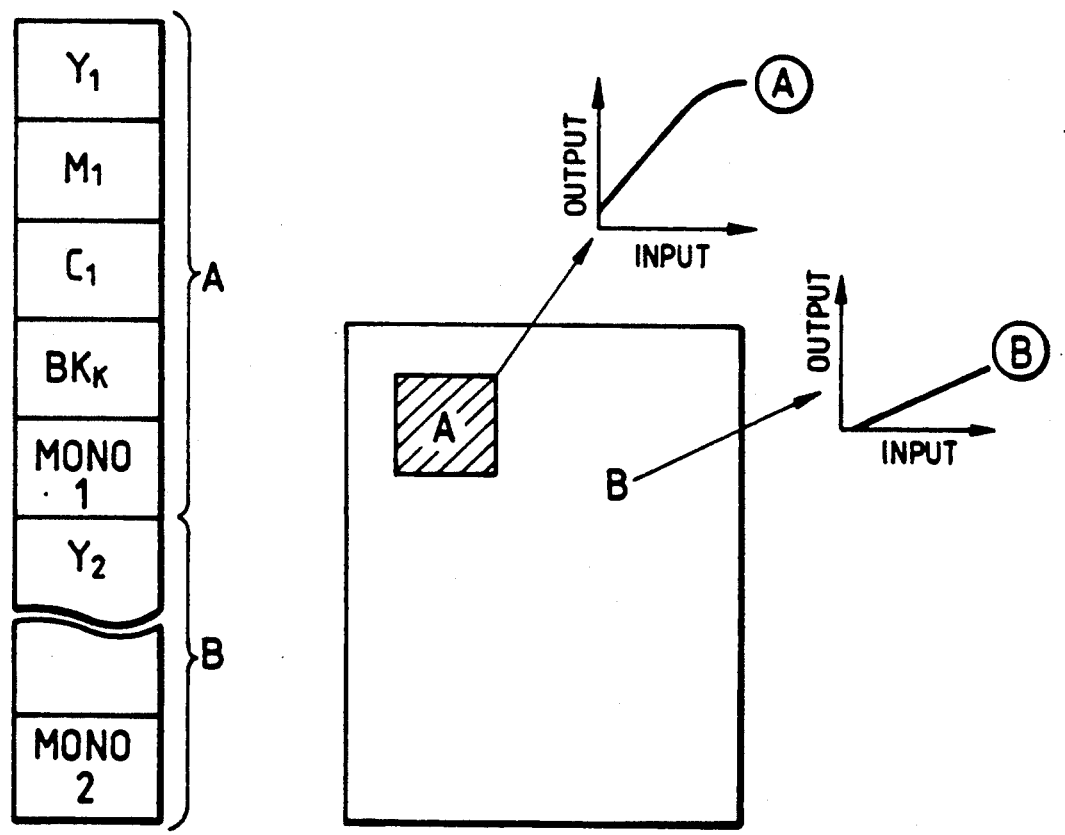
FIG. 6 is a chart showing two gamma characteristics of a RAM 52 shown in FIG. 2.

Numeral 52 indicates a gamma conversion circuit for controlling the color balance and color density of the output image, basically relying on data conversion utilizing a look-up table, of which data are modified by the inputs from the operation unit. The RAM 52 of the present embodiment has at least two gamma characteristics for each of yellow, magenta, cyan, black and monocolor, as shown in FIGS. 6A and 6B, whereby the areas A and B can be given different gamma characteristics in a print.

The switching of the areas A and B is conducted by the EN signal 108 from the video interface 101.

The gamma converting RAM 52 is so constructed as to select characteristics for each color, and said characteristic can be modified from the controller 13 by the actuation of liquid crystal touch panel keys on the operation panel.

A variable magnification control circuit 53 and a 5-line buffer 54 modifies the image magnification of the output signal of the gamma conversion circuit 52, and a filter circuit 55 executes edge enhancement and smoothing. The output of the filter circuit 55 is supplied, through a printer interface circuit 56, to the color printer 2.

Thus, in the present system, the color image data from the video processing apparatus 3 are fitted in the area designated by the digitizer 16, and optimum color correction and gamma correction are made for the original scanning unit 11 and for the video processing apparatus 3.

In the following there will be explained the structure of the video processing apparatus, with reference to FIG. 7.

Figure 7:
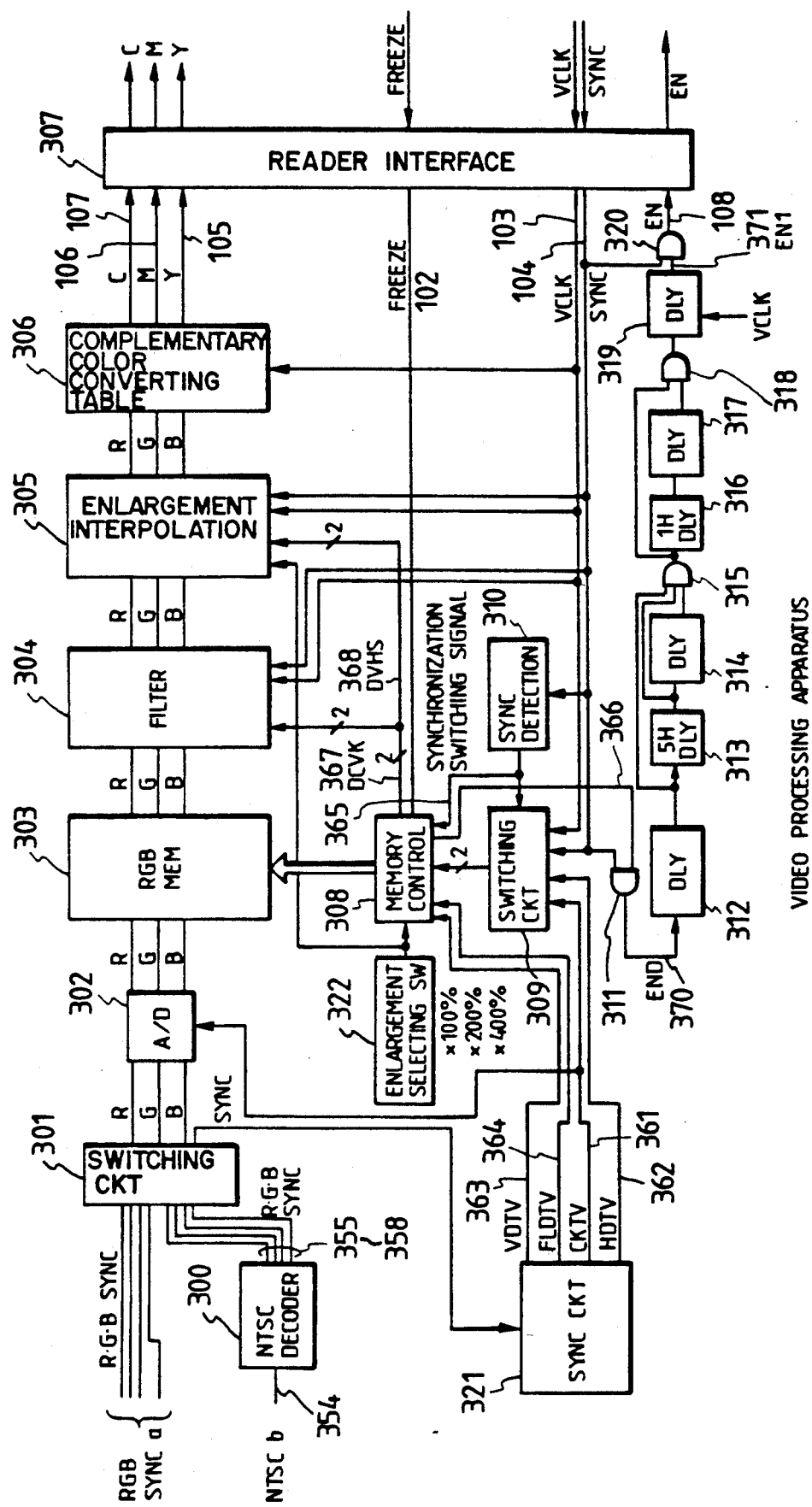
FIG. 7 is a block diagram of a video processing apparatus 3.

In FIG. 7 there are shown an NTSC decoder 300 for converting the input composite signal such as NTSC signal into the signals R, G, B; a switching circuit 301 for selecting either the RGB input signals a or the R, G, B signals from the NTSC decoder 300; an A/D converter 302 for individual A/D conversion of the R, G, B signals selected by the switching circuit 301; a memory 303 for storing the signals subjected to A/D conversion in the A/D converter 302 and having a capacity of at least a frame for each of the R, G, B signals; a digital filter 304 for edge enhancement of smoothing on the signal read from the memory 303; an enlarging interpolation circuit 305 for effecting image enlargement with the signals filtered by the filter 304; and a complementary color conversion table 306 for converting the R, G, B signals interpolated by the interpolation circuit 305 into the respectively complementary color signals Y, M and C.

A memory control circuit 308 controls the reading, writing, refreshing and addressing of the memory 303, and effects the writing of the memory 303 in response to the FREEZE signal entered through the interface 307.

Said control circuit 308 also receives a vertical synchronization signal VDTV 363 of television, a field discrimination signal FLDTV generated from a SYNC circuit 321, the output signal of the switching circuit 309, the output signal of a SYNC detecting circuit 310, and the output signal of a magnification selecting switch 322. Said control circuit 308 also generates an area signal 366 triggered by said SYNC signal and indicating the effective area of the memory 303. The switching circuit 309 receives a television clock signal C/TTV 36a, a horizontal synchronization signal HDTV 362, an interface clock signal VCLK 103, and the aforementioned SYNC signal 104, and selects either the signals VCLK 103 and SYNC 104, or the signals CKTV and HDTV respectively when the SYNC detecting circuit 310 detects the presence or absence of the SYNC signal.

There are further provided a gate 311 for logic calculation of the area signal 366 and the SYNC signal 104; a delay circuit 312 for compensating the delay caused by the data latching in the filter 304 and the enlarging interpolation circuit 305; delay circuits 313-315 for compensating the delay caused by filtering in the filter 304, wherein the delay circuit 313 has a delay time of 5 horizontal lines, while the circuit 314 has a delay time of 7 horizontal lines, and 315 is an AND gate; and delay circuits 316-318 for compensating the delay caused by the enlarging interpolation executed in the enlarging interpolation circuit 305, wherein the delay circuit 316 has a delay time of 1 horizontal line, while the delay circuit 317 has a delay time of a pixel, and the delay circuit 318 serves for compensating the delay caused by the data latching in the aforementioned complementary color conversion table 306.

The above-mentioned delay circuits 312, 313, 314, 316 and 317 are driven by the aforementioned signals DVCK 367 and DVSH 368. When the enlarging ratio is modified by the selecting switch 322, the repeating period of said signals is also varied, so that the delay time of the aforementioned delay circuits is also changed.

Numeral 320 is an AND gate for generating the logic product of the SYNC signal 104 and the output signal EN1 of the delay circuit 318.

In the following there will be explained the function of the embodiment explained above. In the video processing apparatus 3, either the R, G, B signals a entered in response to the FREEZE signal 102 supplied from the video processing unit 2, or the R, G, B signals 355-357 obtained by decoding of the NTSC signal b with the NTSC decoder 300, are selected by the switching circuit 301, then digitized by the A/D converter 302 according to the CKTV signal 361 obtained from the SYNC circuit 321, and stored in the memory 303. In the present embodiment, the number of pixels of said memory is selected as 640×480. The timing of the reading, writing and refreshing of the memory 303 is controlled by the memory control circuit 308. When the SYNC signal 104 is not entered from the video processing unit 12, the SYNC detecting circuit 310 identifies the absence of the SYNC signal, whereupon the switching circuit 309 selects the synchronization signals CKTV 361 and HDTV 362 of the television. On the other hand, when the SYNC signal 104 is entered from the video processing unit 12, the switching circuit 309 selects the signals VCLK 103 and SYNC 104, whereby the memory 303 is read with the timing of the signals VCLK 103 and SYNC 104 entered through the interface.

The image magnification of the video image to be inlaid in the image of the reflective original 999 is fixed to 100%. 200% or 400%, which are selected by the magnification selecting switch 322. The output signal thereof is supplied to the memory control circuit 308 thereby controlling the data reading from the memory 303. In the case of the image magnification being 200%, the pixels of a line are read twice, and, in a case of its being 400%, they are read four times. In each magnification of 100%, 200% or 400%, the synchronization of the memory 303, filter circuit 304 and enlarging interpolation circuit 305 is achieved by the memory control circuit 308, in synchronization with the signals DVCK 365 and DVHS 366.

The signals read from the memory 303 are subjected to edge enhancement or smoothing by a filtering with matrix calculation of 5×7 pixels in the filter circuit 304, then to interpolation for the image magnification of 200% or 400% in the enlarging interpolation circuit 305, further to the conversion of the R, G, B signals respectively into the signals C107, M106 and Y105 by the complementary color conversion table 306, and transferred to the video processing unit 12 through the reader interface circuit 307.

In the present embodiment, the R, G, B data read from the memory 303 are processed in so-called pipeline structure involving the filter circuit 304, the enlarging interpolation circuit 305 and the complementary color conversion table 304, so that a delay in time is inevitable from the data input to the data output in each circuit. Therefore, since the video processing apparatus 3 executes processes of plural stages, there is required a predetermined time from the instruction of image output to the actual output. In order to compensate for said delay, the present embodiment employs the EN signal 108 generated from the interface. The delay circuits 312, 314, 317, 318, the delay circuits in the scanning line direction 313, 315, and the gates 315, 318 cause delays same as the delay times in the circuits 303, 304, 305 and 306, and the EN signal 108 is rendered effective during the release of the effective image data C107, M106 and Y105.

In the present embodiment, there are employed 640×480 pixels for achieving a 1:1 mesh ratio (ratio of vertical size to horizontal size of a pixel), and such image data are released for realizing an image magnification of 100%, 200% or 400%. However, in this state, the SYNC signal 104 supplied to the interface 307 may not match the size of the enlarged image data. For this reason the memory control circuit 308, for controlling the memory 303, generates an image area signal 366 indicating the image size to be read by the SYNC signal 104, namely 640×480 pixels (or 1280×960 pixels in case of the magnification of 200% or 2560×1920 pixels in case of magnification of 400%). Then the gate 311 produces the logic product of said area signal 366 and the SYNC signal 104, and the gate 320 produces the logic product of the output EN1 371 from the delay circuit 319 and the SYNC signal 104. In this manner, if the area for inlay synthesis indicated by the SYNC signal is larger than the image output area, the area of the EN signal 108 is limited by the image area signal 366. On the other hand, if the area of the SYNC signal 104 is smaller, the image area is forcedly limited to the area of said SYNC signal. These operations are shown in FIGS. 8A and 8B, which show the SYNC signal 104, area signal 366, END signal 370, EN signal 108 and image data 105-107, respectively in a case in which the SYNC signal is longer in duration than the area signal, namely a case in which the size of the image to be fitted is smaller than the area for fitting, and a contrary case in which the size of the image is larger than the area for fitting.

Figure 8A:
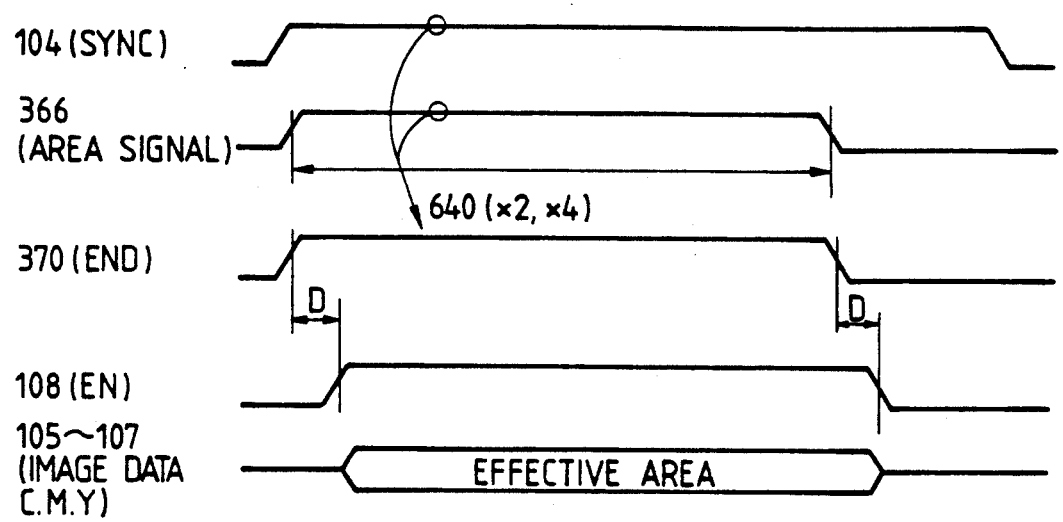
FIGS. 8A and 8B are timing charts showing the function of the video processing apparatus 3.
Figure 8B:
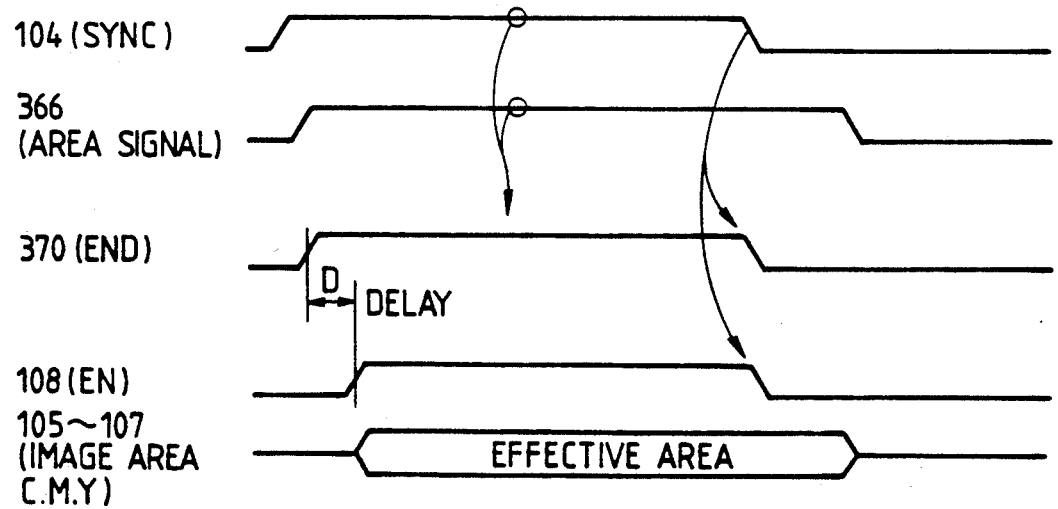

In FIGS. 8A and 8B, a duration D indicates the delay time caused by the delay circuits 212-318 shown in FIG. 7.

As explained in the foregoing, the filter circuit 304 constitutes a filter through calculation of the values of pixels in a 5×7 window. This reduces the effective image area by a line to several lines, but such reduction is practically negligible. The delay circuits 316, 317 and the gate 318 for the enlarging interpolation circuit 305 have a similar function.

Figure 9A:
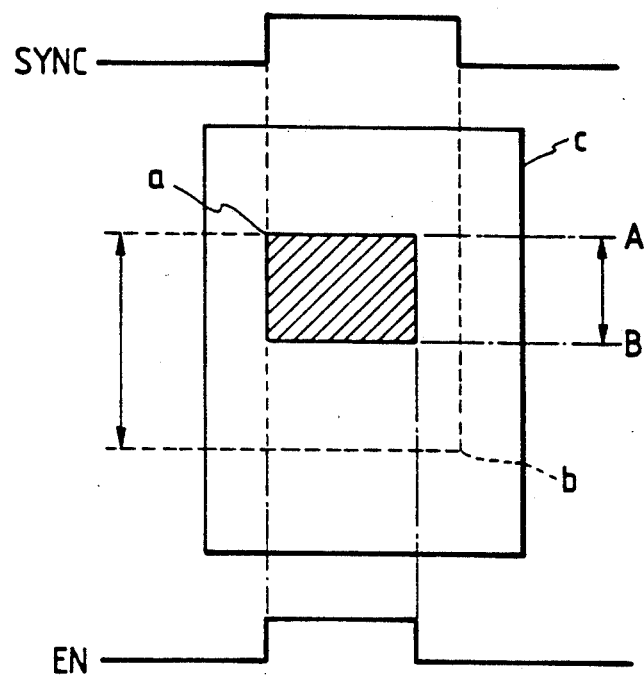
FIGS. 9A and 9B are views of a print image obtained after image synthesis by the apparatus of the present embodiment.
Figure 9B:
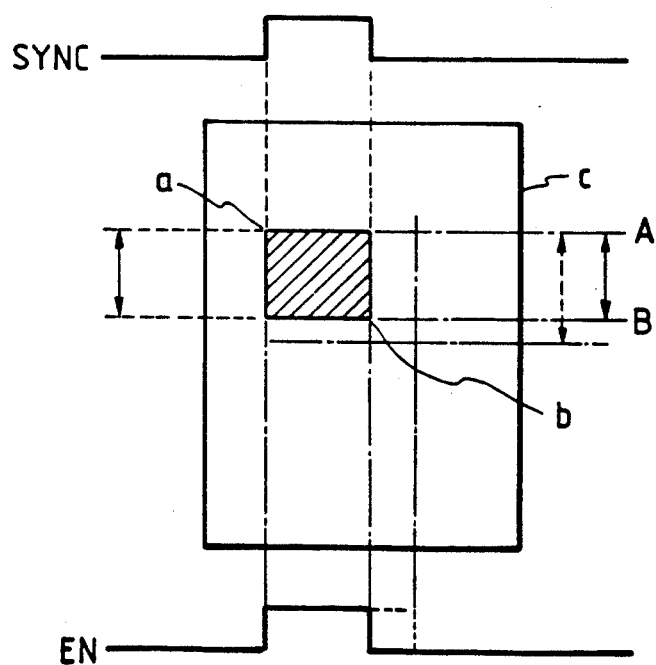

In the following there will be explained the printed image obtained after image synthesis, with reference to FIG. 9. The area for video image inlay is designated by two points a, b with the digitizer 16. According to the thus-designated area, the SYNC signal 104 is supplied from the video processing unit 12 to the video processing apparatus 3, which in response sends the video image signals C107, M106, Y105 to the video processing unit 12 in said area. If the area designated by the digitizer 16 is larger as shown in FIG. 9A, the video processing apparatus 3 releases the EN signal 108 indicating the effective area of the video image, and the video processing unit 12 fits the video image only in the area indicated by said EN signal 108. Outside said area, the image of the original 999 placed on the color image reader 1 is printed. On the other hand, if the area a-b designated by the digitizer 16 is smaller than the effective area of the video image as shown in FIG. 9B, the area of inlay synthesis is defined by the SYNC signal 104. As a result, the inlay synthesis of the video image is made in the hatched area.

The memory 303 of the present embodiment is composed for example of a DRAM, so that a refreshing operation is required for remaining the stored data. In the ordinary storage of the memory content, or at the writing of the video signals (RGB signals or NTSC signals) entered by the FREEZE signal 102, or the retaining of the stored data, refreshing signals are generated according to the timing of the HDTV signal 362. Also, at the memory reading by the SYNC signal 104 supplied from the video processing unit 12, said refreshing signals are generated according to the timing of the SYNC signal 104. Since the repeating period of the HDTV signal 362 is significantly different from that of the SYNC signal 104 (they are different by about four times in the present embodiment), the number of refreshing operations is modified for each signal.

In the following there will be explained in detail the structure of the memory control circuit 308, with reference to FIG. 12.

Figure 12:
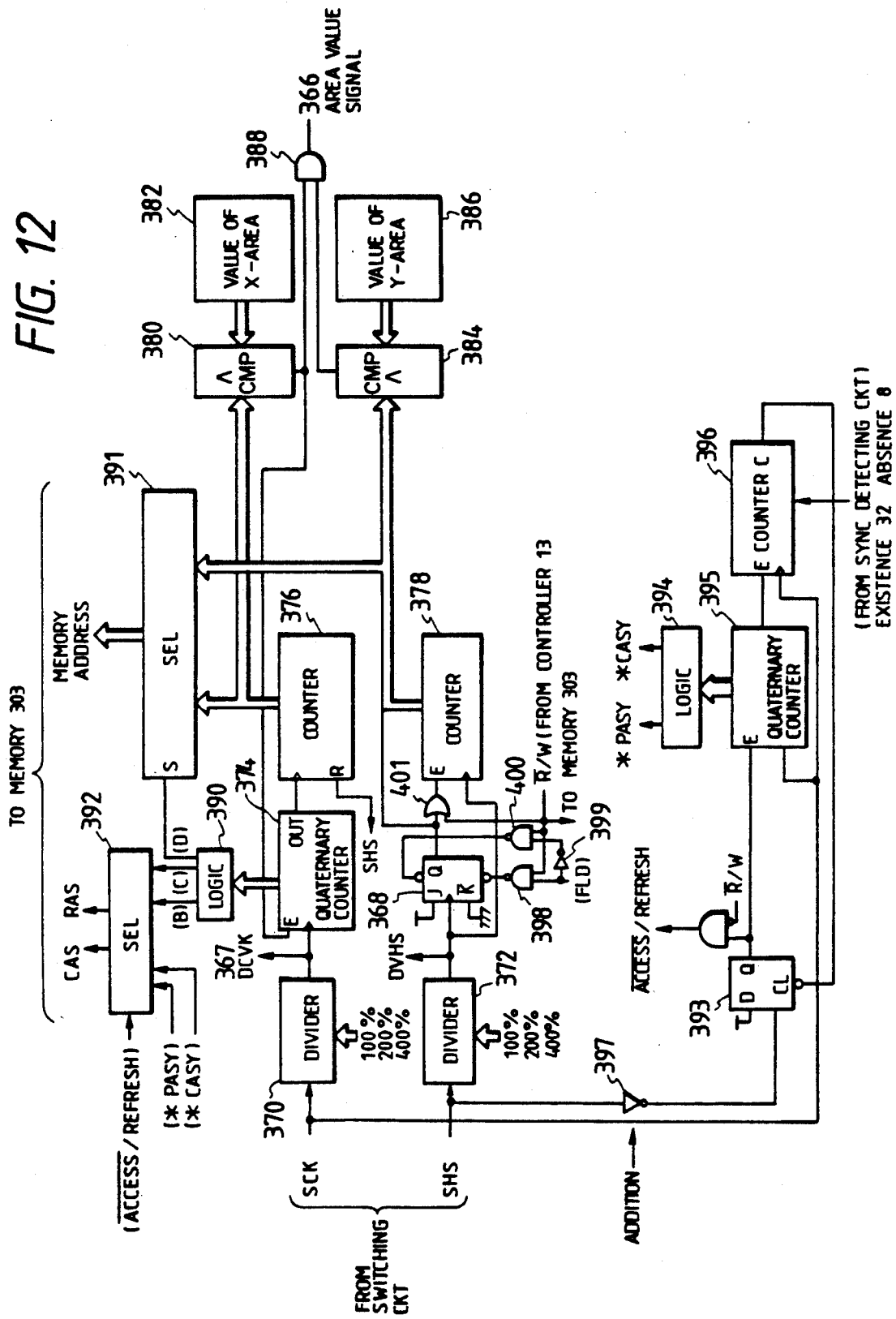
FIG. 12 is a block diagram showing the structure of a memory control circuit 308 shown in FIG. 8.

In FIG. 12, signals SCK (selected clock) and SHS (selected horizontal signal) are selected by said switching circuit 309 for supply to the memory control circuit 308. There are also shown a frequency divider 370 for dividing the frequency of the signal SCK with a variable dividing ratio according to the setting of the magnification setting switch 322; a frequency divider 372 for dividing the frequency of the signal SHS with a similarly variable dividing ratio; a quaternary counter 374 for counting the output of the frequency divider 370; a counter 376 for counting the address in the main scanning direction; a counter 378 for counting the address in the sub-scanning direction; a comparator 380 for comparing the count of the counter 376 with the output of an area value 382; and a comparator 384 for comparing the count of the counter 378 with an area value 386. The values 382, 386 are set in advance at the numbers of pixels in the horizontal and vertical directions of the image memory 303.

Thus, when either of the outputs of the comparators 380, 384 is shifted to the L-level, the output of the gate 388 and the area value signal are likewise shifted to the L-level.

Figure 13A:
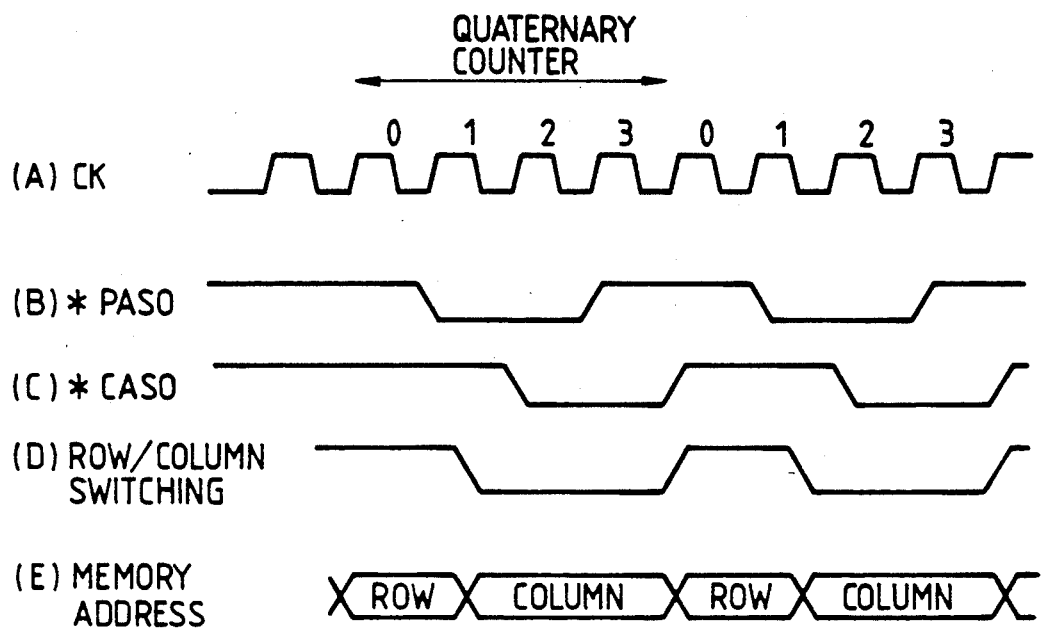
FIGS. 13A and 13B are timing charts showing the function of the memory control circuit 308 shown in FIG. 12.
Figure 13B:
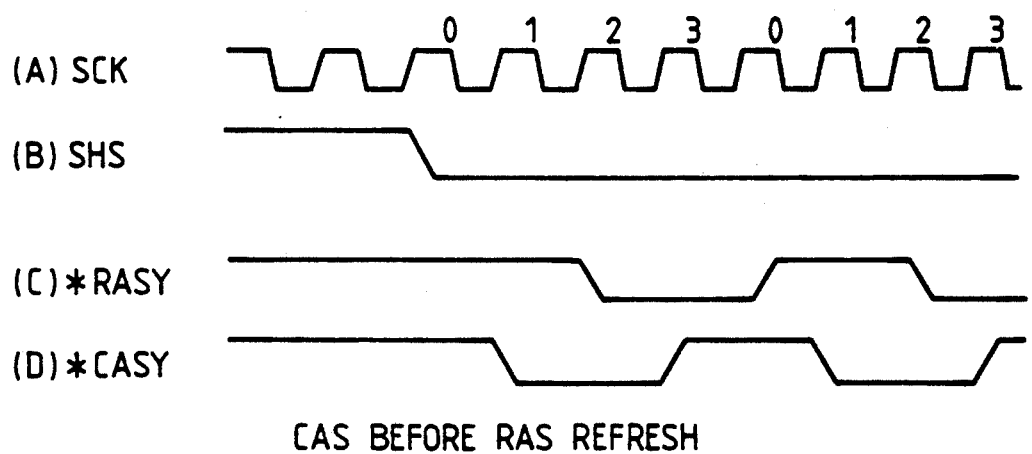

A logic circuit 390 produces, from the 2-bit output of the quaternary counter 374, a RAS (raw address strobe) signal (B), a CAS (column address strobe) signal (C) and a signal (D) for controlling a selector 391 to be explained later, as shown in FIG. 13A. There are further provided a selector 391 for selecting either the output of the counter 376 or that of the counter 378 as the memory address, in response to the above-mentioned signal (D); a selector 392 for supplying the memory 303 with either the above-mentioned signals (B), (C) or refreshing signals (C), (D) shown in FIG. 13B; a D-flip-flop 393 for fetching the SHS signal from the switch circuit 309 through an inverter 397, and giving the output to the enable terminal of the quaternary counter 395; a quaternary counter 395 for counting the SCK signal from the switch circuit 309; a logic circuit 394 for generating, from the 2-bit output of the counter 395, signals *RASY (C) and *CASY (D) shown in FIG. 13B; and a counter 396 to be enabled according to the output of the quaternary counter 395. Said counter 396 is set at "32" or "8" respectively when the SYNC detecting circuit 310 identifies the presence or absence of the SYNC signal, and counts the SCK signal downwards, providing the output to the clear terminal of the D-flip-flop 393. AND gates 398, 400 and an inverter 399 enable a JK-flip-flop 368 according to a read/write signal $\overline{R}/W$ from the controller 13 and a FLD signal from the SYNC circuit 321 shown in FIG. 7. An OR gate 401 selects the output Q of the JK-flip-flop 368 or the signal $\overline{R}/W$ for supply to the enable terminal of the counter 378.

In the following there will be explained the function of the above-explained memory control circuit 308.

At first there will be explained a case of writing instruction from the controller 13. In this case the $\overline{R}/W$ from the controller 13 is at the H-level, whereby the counter 378 is enabled, and the output Q of the JK-flip-flop 368 is determined according to the level of the FLD signal. The JK-flip-flop 368 indicates the vertical address of the memory 303 in cooperation with the counter 378. The output of the JK-flip-flop 368 indicates the lowermost bit of the vertical address, while the output of the counter 378 indicates other bits. Consequently, when the FLD signal is at the L-level indicating an odd field, the output Q of the JK-flip-flop is fixed at the H-level, whereby odd addresses alone are released as the vertical addresses. On the other hand, when the FLD signal is at the H-level indicating an even field, the output Q of the JK-flip-flop 368 is fixed at the L-level whereby even addresses alone are released as the vertical address.

On the other hand, the horizontal addresses are generated by the frequency divider 370, quaternary counter 374 and counter 376.

The horizontal and vertical addresses generated in this manner are selected, as the memory address, by the selector 391 according to the output of the logic circuit 390. The signals RAS, CAS are generated in synchronization with said horizontal and vertical addresses as shown in FIG. 13A, thereby effecting the writing operation. In this case the selector 392 provides the memory 303 with the signals from the logic circuit 390.

In the following there will be explained a case in which a reading signal is supplied from the controller 13.

In such stage the $\overline{R}/W$ signal is shifted to the L-level, whereby the output of the JK-flip-flop 368 becomes independent from the FLD signal, and said flip-flop 368 and the counter 378 constitute a single counter. Consequently, different from the writing operation, the vertical address is increased by one at a time.

Also in the reading operation, when a blanking period is started by the downshift of the SHS signal, the output signal access/refresh of a D-flip-flop 393 is inverted to the H-level to realize the refreshing state for the memory 303. In this state, the selector 392 provides the memory 303 with signals $RAS_{65}$, $CAS_\gamma$ generated by the logic circuit 394 for refreshing (shown in FIG. 13B), whereby the memory 303 automatically executes the refreshing operation.

Also in this case, the counter 396 is set at a value corresponding to the signal from the SYNC detecting circuit 310, for example "32" or "8" respectively when said detecting circuit 310 identifies the presence or absence of the SYNC signal. This is because of the aforementioned necessity of varying the timing of refreshing operation, based on the difference in repeating period of the HDTV signal 362 and the SYNC signal 104.

Also in the reading operation, the dividing ratios of the frequency dividers 370, 372 are modified according to the image magnification, thus extending the repeating period of the pulses supplied to the counter 376, 378 in case of an image enlargement. Also the gate 388 releases the area signal 366, according to the comparison of the area values 382, 386 with the counts of the counters 376, 378.

In the following there will be explained the structure of the color printer 2, for printing the image signals processed in the video processing unit 12, while making reference to FIG. 1. In FIG. 1, a scanner 711 is provided with a laser unit for converting the image signals from the reader 1 into optical signals; a polygon mirror 712 for example of octagonal shape; a motor (not shown) for rotating said mirror 712; and an $f/\theta$ lens (imaging lens) 713. There are further provided a mirror 714 for deflecting the optical path of the laser beam; and a photosensitive drum 715. The laser beam from the laser unit is reflected by the polygon mirror 712, and linearly scans (raster scanning) the photosensitive drum 715 through the lens 713 and the mirror 714, thereby forming a latent image corresponding to the original image.

There are further provided a primary charger 717, a whole-surface exposure lamp 718, a cleaner station 723 for recovering the toner which has not been transferred and thus remain on the drum; and a pre-transfer charger 724; which are positioned around the periphery of the photosensitive drum 715. A developing unit 726 for developing the electrolatent image formed on the photosensitive drum 715 by the exposure to laser beam is provided with developing sleeves 731Y (yellow), 731M (magenta), 731C(cyan) and 731Bk (black) for effecting development in contact with the photosensitive drum 715, toner hoppers 730Y, 730M, 730C and 730Bk for toner supply, and screws 732 for toner transfer, which in combination constitute the developing unit 726 and are positioned around a rotary shaft P thereof. For example, in case of forming a yellow toner image, the development is conducted in the illustrated position with the yellow toner, and, in case of forming a magenta toner image, the developing unit 726 is so rotated about the shaft P that the developing sleeve 731M in the magenta developing unit is brought to a position in contact with the photosensitive drum 715. The development with cyan or black color is also conducted in a similar manner.

There are further provided a transfer drum 176 for transferring a toner image formed on the photosensitive drum 715 onto the recording sheet; an actuator plate 719 for detecting the position of the transfer drum 716; a position sensor 720 for detecting a home position of said transfer drum 716 when said actuator plate 720 is brought close; a transfer drum cleaner 725; a paper pressing roller 727; a charge eliminator 728; and a transfer charger 727; a charge eliminator 728; and a transfer charger 729; which are positioned around the transfer roller 716.

There are further provided paper cassettes 735, 736 containing recording paper (sheets); paper feeding rollers 735, 736 for feeding sheets from the cassettes 735, 736; and timing rollers 739, 740, 741 for regulating the timing of sheet feeding and transportation. The sheet transported by these rollers is guided by a paper guide 749, and, while the front end thereof being held by a gripper to be explained later, it is wound around the transfer drum 716 and enters an image forming process.

There are further shown a drum motor 550 for rotating the photosensitive drum 715 and the transfer drum 716 in synchronization; a separating claw 750 for separating the sheet from the transfer drum 716 after the completion of the image forming process; a conveyor belt 742 for transporting shut separated sheet; and an image fixing station 743 having a pair of heat-pressure rollers 744, 745 for fixing the image of the sheet transported by the conveyor belt 742.

In the above-explained structure, a latent image corresponding to yellow is at first formed on the photosensitive drum 715 by the exposure to the laser beam, then developed with the developing unit 731Y and transferred onto the sheet on the transfer drum 716. Subsequently, the developing unit 726 is rotated about the illustrated shaft P. Then a latent image corresponding to magenta color is formed on the photosensitive drum by the exposure to laser beam, and is subsequently processed in a similar manner. This operation is repeated also for cyan and black colors. Upon completion of the image formation, the sheet is separated by the separating claw 750, and is subjected to image fixation in the fixing station 743, whereby a print of the color image is completed.

In the foregoing embodiment, the means for designating the area of image inlay is composed of the digitizer shown in FIG. 3, and the video processing apparatus 3 is employed as means for supplying image of a predetermined size, to be fitted into said area.

Also there is provided means for providing a portion between the area designated by said designating means and the area of the image supplied by said supplying means, with another image different from said image, in such a manner that the image from the video processing apparatus is fitted only in the smaller one of the area designated by the digitizer and the area of the image from the video processing apparatus 3, and the switching circuit 100 is controlled in such a manner that, if the area designated by the digitizer is larger than the area of the video image, the image from the original scanning unit 11 is fitted in the portion between said areas.

Thus the foregoing embodiment is capable of satisfactory image synthesis without blanks, in the synthesis of plural images.

Also, there is provided means for preferentially effecting inlay synthesis in the smaller one of the area designated by said designating means and the area of the image supplied by said supplying means, in such a manner that the image from the video processing apparatus is fitted only in the smaller one of the area designated by the digitizer and the area of the image from the video processing apparatus 3, and the switching circuit 100 is controlled in the above-mentioned manner.

Thus, the foregoing embodiment is capable of satisfactory image synthesis without blanks, in the synthesis of plural images.

Also, in the foregoing embodiment, the switching circuit 100 controlled by the area signal generating circuit 51 is employed as means for synthesizing the externally supplied video signals in a predetermined position of the original image, and is used as a gate for controlling the trimming means which controls the trimming of image in copying of an original image, according to the signals 110, 111 from the control unit. The designating means of the present invention is composed of the digitizer shown in FIG. 3.

However, the present invention is not limited to such embodiment, and there may naturally be employed other designating means, such as a mouse.

As explained in the foregoing, the present invention enables designation of the synthesizing position of video signal and of the image area in original copying with a simple structure, thereby simplifying the operation.

Furthermore, in the foregoing embodiment, the means for synthesizing a first input image signal and a second input image signal is composed of the switching circuit 100, for synthesizing the image from the video processing unit 3 and the image from the original scanning unit, but the present invention is not limited to such embodiment. The present invention is effectively utilized upon synthesizing two images.

Furthermore, means for generating a switching signal for the first and second input image signals is composed of the area signal generating circuit 51 which is controlled by the digitizer 16, but there may be employed other instructing means such as a mouse.

Furthermore, control means for switching the state of synthesis of the synthesizing means with a predetermined delay from the instruction signal is composed of circuits 312-320 in the video processing apparatus 3. More specifically, in said embodiment, an instruction signal 105 is given to the video processing unit 3, which in response executes processing and releases the image data after a predetermined delay, and the unit 3 simultaneously supplies the switching circuit 100 with the switching EN signal 108. However, the present invention is not limited by such embodiment, and a signal corresponding to said EN signal 108 may be directly generated by the circuit 51 without the intervention of the video processing unit.

As explained above, the foregoing embodiment is capable, for example in synthesizing two images, of satisfactory synthesis at the peripheral portion of the area of image synthesis.

Figure 11:
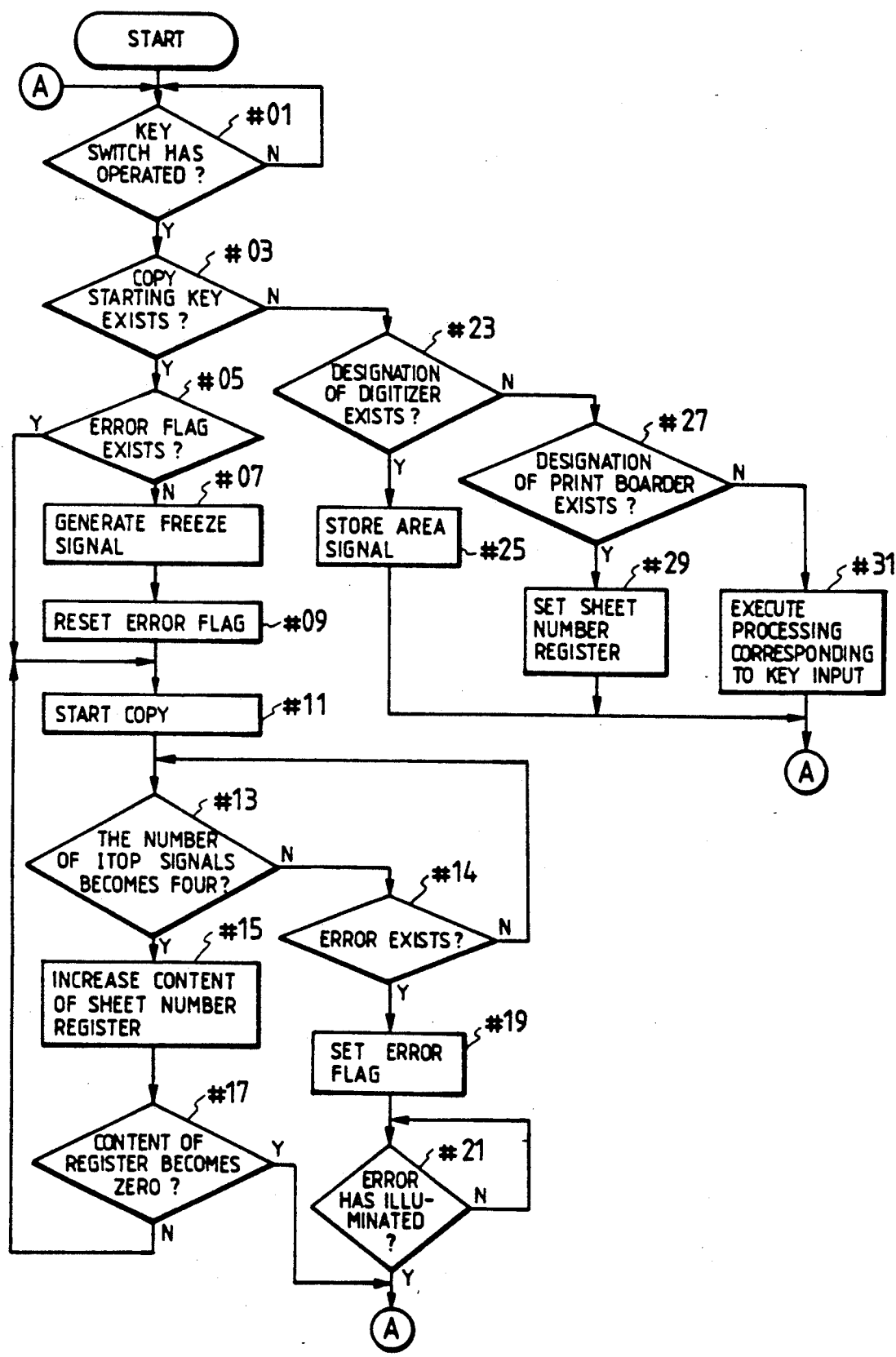
FIG. 11 is a timing chart showing the function of a controller 13 shown in FIG. 1.

Furthermore, in the foregoing embodiment, an error in the course of a printing operation is detected by a step #14 shown in FIG. 11, and, in the case of detection of an error, steps #07 to #09 are executed to prohibit new storage in the memory 303, at a new print start instruction.

Therefore the foregoing embodiment can realize operability without causing an uneasy feeling to the operator.

Furthermore, in the foregoing embodiment, the memory requiring periodical refreshing is composed of the memory 303; a first synchronizing system for generating the synchronization signal for said refreshing operation is composed of the SYNC circuit 321; a second synchronization system, not synchronized with said first synchronizing system, is composed of the system control pulse generator 57 shown in FIG. 2; and control means for switching the first and second synchronization systems with the switching circuit 309 shown in FIG. 7 is composed of the counters 396, 395 and the D-flip-flop 393.

However, it is also possible, instead of switching the synchronization signals from such synchronization systems, to vary the repeating period of the synchronization signal itself.

As explained in the foregoing, the present invention enables secure refreshing operation even at the switching of the synchronization system for the purpose of refreshing operation, thereby preventing the destruction of the information stored in the memory.

What is claimed is:

1. An image processing apparatus comprising:
   a) a memory requiring refreshing operation at a predetermined interval;
   b) a first synchronization system for generating synchronization signals for said refreshing operation;
   c) a second synchronization system not synchronized with said first synchronization system; and
   d) control means for prohibiting the refreshing operation in a cycle longer than said predetermined interval at the switching of said first and second synchronization system.

2. An apparatus according to claim 1, wherein said control means is adapted to realize different repeating intervals for the synchronization signals of said first and second synchronization systems, thereby prohibiting a refreshing interval longer than said predetermined interval.

3. An apparatus according to claim 1, wherein said memory is an image memory.

4. An apparatus according to claim 1, further comprising:
   e) writing means for data writing into said memory; and
   f) reading means for data reading from said memory.

5. An apparatus according to claim 4, wherein said first synchronization, system is synchronized with the synchronization signal for the signals to be written by said writing means.

6. An apparatus according to claim 4, wherein said second synchronization system is synchronized with the reading operation by said reading means.

7. An apparatus according to claim 6, further comprising means for forming an image corresponding to the data read by said reading means.

8. An apparatus according to claim 7, wherein said forming means comprises a printer.

9. An apparatus according to claim 8, wherein said printer comprises a color printer.

* * * * *

UNITED STATES PATENT AND TRADEMARK OFFICE
CERTIFICATE OF CORRECTION

PATENT NO. : 5,204,759
DATED : April 20, 1993
INVENTOR(S) : MASANORI SAKAI, ET AL.

Page 1 of 3

It is certified that error appears in the above-identified patent and that said Letters Patent is hereby corrected as shown below:

On the title page:
BETWEEN [60] AND [51]

Insert: -- [30] FOREIGN APPLICATION PRIORITY DATA

```
        Oct. 16, 1987  [JP]  Japan ........ 62-261015
        Oct. 16, 1987  [JP]  Japan ........ 62-261016
        Oct. 16, 1987  [JP]  Japan ........ 62-261017
        Oct. 16, 1987  [JP]  Japan ........ 62-261018
        Oct. 16, 1987  [JP]  Japan ........ 62-261019
        Oct. 16, 1987  [JP]  Japan ........ 62-261020 --.
```

IN [57] ABSTRACT

Line 2, "standardized" should read
--broadcast-standardized--

In the Drawings:
SHEET 5 OF 14

FIG. 5, "OLOR" should read --COLOR--.

SHEET 11 OF 14

FIG. 11, "BOARDER" should read --BORDER--.

COLUMN 1

Line 25, "the" should be deleted.
Line 35, "of" should read --of the--.

UNITED STATES PATENT AND TRADEMARK OFFICE
CERTIFICATE OF CORRECTION

PATENT NO. : 5,204,759
DATED : April 20, 1993
INVENTOR(S) : MASANORI SAKAI, ET AL.

It is certified that error appears in the above-identified patent and that said Letters Patent is hereby corrected as shown below:

COLUMN 2

Line 6, "last." should read --lost.--.
Line 28, "means;" should read --means.--.

COLUMN 3

Line 14, "thereof" should read --thereof,--.

COLUMN 6

Line 16, "signal CRUSY" should read --signal CBUSY--.
Line 56, "are:" should read --:--.

COLUMN 7

Line 28, "repating" should read --repeating--.

COLUMN 8

Line 66, "ends" should read --end--.

COLUMN 10

Line 37, "serves" should read --serve--.

COLUMN 12

Line 44, "the" (first occurrence) should read --a--.

COLUMN 15

Line 57, "$RAS_{65}$," should read --$RAS_\gamma$,--.

UNITED STATES PATENT AND TRADEMARK OFFICE
CERTIFICATE OF CORRECTION

PATENT NO.  : 5,204,759
DATED       : April 20, 1993
INVENTOR(S) : MASANORI SAKAI, ET AL.

It is certified that error appears in the above-identified patent and that said Letters Patent is hereby corrected as shown below:

<u>COLUMN 19</u>

Line 12, "system." should read --systems.--.

<u>COLUMN 20</u>

Line 7, "synchronization," should read --synchronization--.

Signed and Sealed this

Fifth Day of April, 1994

BRUCE LEHMAN

Attest:

Attesting Officer

Commissioner of Patents and Trademarks